Oct. 27, 1953  R. M. ISHAM  2,657,237
PROCESS FOR THE SEPARATION AND RECOVERY OF METHYL AMINES
Filed Aug. 6, 1948  2 Sheets-Sheet 2

INVENTOR.
ROBERT M. ISHAM
BY
Raymond J Norton

Patented Oct. 27, 1953

2,657,237

UNITED STATES PATENT OFFICE 2,657,237

PROCESS FOR THE SEPARATION AND RECOVERY OF METHYL AMINES

Robert M. Isham, Okmulgee, Okla., assignor, by mesne assignments, to Southern Production Company, Inc., Fort Worth, Tex., a corporation of Delaware Application August 6, 1948, Serial No. 42,928

1 Claim. (Cl. 260—583)

This invention relates to improved methods of producing methyl amines and more particularly to the production of dimethylamine and its efficient separation from methylamine and trimethylamine.

As is well known, the methods now employed commercially for the production of methyl amines are tedious, protracted and costly. In the currently employed method, the methyl amines are produced by contacting mixtures of methanol vapor and ammonia, at elevated temperatures with a catalyst such as activated alumina or its equivalent. The reaction product comprises a mixture of all three of the amines, water and unreacted methanol and ammonia. The separation of these several compounds is a prolonged and expensive procedure. The crude reaction product is subjected to a series of distillation steps whereby the methanol and water are removed, then the ammonia is separated from the residual material as an azeotrope in admixture with some of the trimethylamine and the three methyl amines are respectively separated by repeated azeotropic distillation at various pressures. These distillation steps are complicated and difficult, requiring as they do the employment of high reflux ratios and elevated pressures. In spite of these prolonged and expensive series of steps, the separation achieved is by no means perfect; thus the dimethylamine usually produced contains up to 3 per cent. or 4 per cent. of the other methyl amines and vice versa.

There is yet another factor which adds materially to the expense of production of the methyl amines. Inasmuch as the methyl amines are subject to desmutation when passed at high temperatures over the amination catalyst, it is the usual practice to recycle the undesired amines back to the catalyst zone, together with make up ammonia and methanol. Thus, in a typical operation where only dimethyl amine is the desired product, the methylamine, trimethylamine, ammonia and methanol, separated from the initial crude reaction product are returned, together with fresh charge, to the catalyst chamber for ultimate conversion to dimethylamine. While such procedure is desirable with respect to achieving complete conversion of the ammonia initially introduced to the particular desired amine, it does involve the multiple repetition of the complicated distillations described above and thus commensurately increases the cost of the end product.

It has recently been suggested to effect the separation of the three methyl amines by extractive distillation with aniline but this process similarly has many shortcomings.

The present invention comprehends the production of methylamines, particularly dimethylamine, in which separation of the several amines is effected by an eminently simple and more economical method than that utilized heretofore. As will be seen, the improved procedures to be described, invoke a new concept of approach to the problem and are based on the initial conversion of certain of the methyl amines to different compounds which are respectively readily separable from each other and from the unconverted amine, followed by regenerating of particular amines from the intermediately formed derivatives. As will be seen, the process also invokes the concept of, so to speak, the stoichiometrical selectivity of a single reagent to react preferentially with selected amines to thereby form the readily separable intermediates.

In order more clearly to explain the invention, typical illustrative methods will be described with reference to the accompanying drawings in which.

Figure 1:
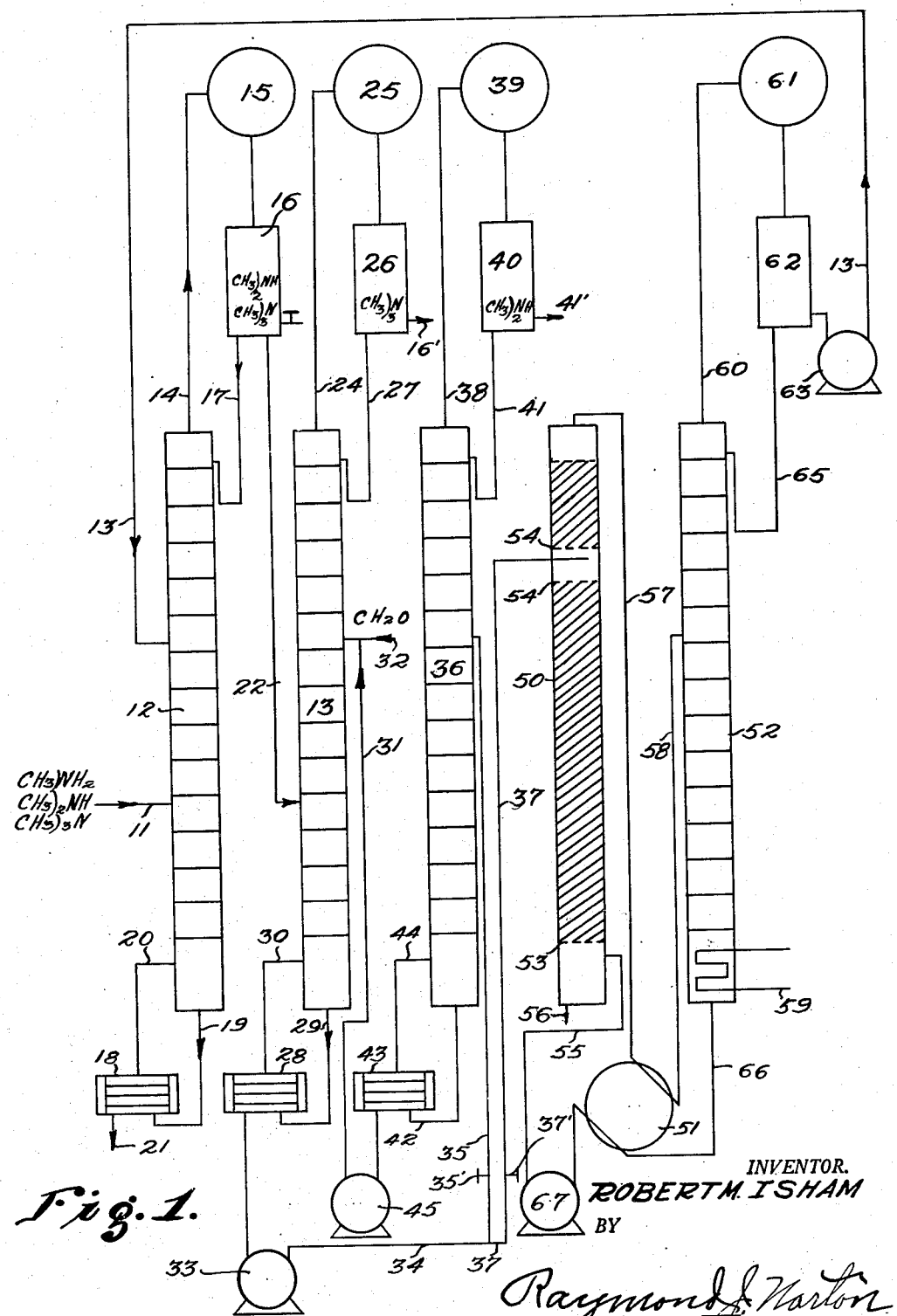
Figure 1 is a diagrammatic illustration in general flow sheet form of an apparatus for effecting the separation of methyl amines.

The mechanism of the separation of methyl amines and associated products stems from the special behavior or reactivity of these methyl amines with formaldehyde. The rationale of the invention, thus, is readily elucidated when such reactivity is considered. Now it is known that three mols of methylamine will react with three mols of formaldehyde to produce three mols of water and one mol of trimethyltrimethylenetriamine. It is similarly known that two mols of dimethylamine will react with one mol of formaldehyde to produce one mol of tetramethylmethylenediamine and one mol of water. It is likewise known that trimethylamine does not react with formaldehyde.

It has been discovered that methylamine will react with tetramethylmethylenediamine to liberate dimethylamine and produce trimethyltrimethylenetriamine. This discovery is, as will be appreciated, of striking significance in respect to the separations contemplated herein. Thus, it is apparent that if a mixture containing both methylamine and dimethylamine is treated with formaldehyde in equimolecular proportions with the contained methylamine, the formaldehyde will react selectively with the methylamine and no dimethylamine will be combined with it.

Another fact also has been discovered which, as will be seen more fully, is fortuitously utilized in the present invention. This is, that tetramethylemethylenediamine can be hydrolyzed by boiling water into formaldehyde and the dimethylamine.

As a result of extensive investigation in this field, it also has been discovered that under properly controlled conditions of catalytic hydrogenation, to be explained more fully hereinafter, trimethyltrimethylenetriamine may be practically quantitatively converted to dimethylamine, while under certain other controlled conditions, it is converted to approximately an equimolecular mixture of the three amines.

The elucidation of the invention will be clear from the foregoing findings. It will be apparent that since the boiling point of trimethyltrimethylenetriamine is 155° C., and the boiling point of tetramethylmethylenediamine is 85° C., while those of the three methyl amines lie between —6.5° C. and 7.4° C., a system embodying these several components lends itself most readily to extremely easy separation of the amines by simple fractional distillation. It will also be clear that when the desired end product is dimethylamine, any methylamine contained in a mixture of amines produced by conventional process can be expeditiously converted to dimethylamine without being repeatedly recycled to the amination unit for desmutation.

Now in light of what has been disclosed, it will be apparent that if a mixture of the three methyl amines are suitably contacted with formaldehyde, as for example, by distilling such amines up a bubble tower in contact with countercurrently flowing aqueous formaldehyde, equimolecular with the methylamine content of the mixture, all of the methylamine will be converted to trimethyltrimethylenetriamine. This latter may be withdrawn from the base of the tower together with water formed in the reaction and that introduced with the formaldehyde while all of the dimethylamine and trimethylamine, free from methylamine, may be withdrawn from the top of the tower. It will be appreciated at this point that in lieu of aqueous formaldehyde, solid polymers in the proper stoichiometric proportion, may be employed in the reaction: in such event there will, of course, be much less dilution of the trimethyltrimethylenetriamine. In the preferred operation, however, anhydrous tetramethylmethylenediamine, produced by a subsequent operation, is charged to the tower in equimolecular proportions to the methylamine. In this operation the resulting trimethyltrimethylenetriamine is withdrawn from the base of the tower in anhydrous condition.

The mixture withdrawn from the upper section of the bubble tower, comprised of dimethylamine and trimethylamine, may be treated in one of several ways. If, for example, it is desired to utilize the dimethylamine for immediate reaction with some reagent, such as an acid chloride, with which the trimethylamine does not react, this may be done without any prior separation of the two amines and the unreacted trimethylamine may be separated from the reaction product and returned, together with the ammonia to the amination unit for eventual desmutation to dimethylamine. Obviously the separated trimethylamine may be utilized in any other manner, for example, for the production of the surface active quaternary ammonium bases.

As will be appreciated, the process of the invention is of wide flexibility and readily permits of a number of different specific treatments of the intermediate products. Thus, if it is desired to produce pure dimethylamine and trimethylamine, this may readily be achieved. In such an operation the mixture of dimethylamine and trimethylamine which escapes from the top of the bubble tower, as previously, is distilled up a second bubble tower countercurrent to a charge of aqueous formaldehyde solution, or of solid polymers of formaldehyde, which charge is adjusted to establish a molar ratio of at least 1:2 with the dimethylamine contained in the mixture. In these circumstances, as explained previously, the dimethylamine reacts with the aldehyde to produce tetramethylmethylenediamine. This latter compound boils at 85° C. in the absence of water and with water forms an azeotrope which boils at 66° C. By properly controlling the top temperature and the reflux in this second bubble tower, pure trimethylamine may be withdrawn as a vapor and recovered for any desired use.

The mixture of tetramethylmethylenediamine and water formed in the second bubble tower may be withdrawn and charged to the middle section of a third bubble tower in which the temperature is controlled to maintain the mixture in a state of active ebullition. This effects hydrolysis of the tetramethylmethylenediamine to formaldehyde and dimethylamine. It will be apparent that by properly controlling the thermal conditions in the tower and the reflux ratio, it is possible to distill off pure dimethylamine from the top of the tower and to withdraw pure aqueous formaldehyde from the base which latter may be recycled to the second bubble tower for further reaction with the dimethylamine in the mixture passing through such second tower. In such an operation, at equilibrium conditions in this third tower, a body of the aqueous azeotrope of tetramethylmethylenediamine, boiling at 66° C. at atmospheric pressure, will be maintained on the trays in the central portion of the tower. Pure dimethylamine, boiling at 7.4° C. will accumulate on the top trays of the tower and distill from the top, and the aqueous formaldehyde, boiling in the neighborhood of 100° C. will accumulate in the base for withdrawal. If the tower is operated under superatmospheric pressure, specifically different temperature conditions will, of course, be maintained but the same separation will be effected. This separation can obviously be made continuous by continuously feeding the charge to the median section of the tower and continuously withdrawing the dimethylamine from the top and the aqueous formaldehyde from the base.

As pointed out previously, in the first bubble tower trimethyltrimethylenetriamine is produced by the reaction of methylamine with formaldehyde. This is withdrawn from the base of the tower in a solution containing from 50 to about 60 per cent. of water. In order to employ this material subsequently in a manner to be described, it is highly desirable that it be anhydrous. This poses quite a difficult problem. Separation of the contained water by distillation is quite difficult since there is a marked tendency for the trimethyltrimethylenetriamine to undergo hydrolytic dissociation and steam distillation even when water entraining agents hour, and without having been subjected to preheating, a large proportion, of the order of 50 per cent, of the trimethyltrimethylenetriamine passes through unchanged while the methyl amines produced may contain 80-85 mol per cent. of dimethylamine. If, however, the mixture of hydrogen and the vapor of trimethyltrimethylenetriamine is first preheated for a short period of from about 1 to 2 minutes at a temperature of 220° C. to 260° C. or higher and such preheated mixture is then passed, without cooling, through the catalyst chamber, all of the trimethyltrimethylenetriamine is hydrogenated and the hydrogenation product contains 93-95 mol per cent. of dimethylamine. It is thus clear that the described catalyst is highly selective for the hydrogenation of monomeric methylmethyleneamine.

When dimethylamine is the only product desired, it will be apparent that the ammonia and methanol charged to the catalytic amination plant should be so proportioned that the product will be comprised largely of methylamine and dimethylamine with relatively little trimethylamine and considerable unreacted ammonia. This, as will be appreciated, is accomplished by employing a charge rich in ammonia and relatively poor in methanol. In these circumstances all of the trimethylamine may be carried off as its binary azeotrope with ammonia in the preliminary distillation of the crude amination product whereby the charge to the separation unit of the invention will consist solely of methylamine and dimethylamine. In such a case following the new process, pure dimethylamine will distill off from the first bubble tower and in an operation where formaldehyde is being charged to the bubble tower, the rest of the purification plant can be eliminated.

As pointed out previously, it may be found desirable to operate the process by charging tetramethylmethylenediamine to the first bubble tower for selective reaction with the methylamine contained in the entering mixtures. In such operation a portion of the dimethylamine distilling from the top of the first tower is diverted and mixed with aqueous formaldehyde to produce thereby the required amount of tetramethylmethylenediamine which product is then treated with a water immiscible solvent in the manner to produce the anhydrous product for introduction into the first reaction-separating zone, that is, the first bubble tower. The dimethylamine liberated in this first tower may be drawn off to storage. In such an operation the second and third bubble towers may be cut out of the system and replaced by a simple water-cooled mixing tank.

The above modifications are merely indicative of many changes and modifications in the procedure employed and the apparatus used which modification will be dictated by the character of the charge material and the end products desired.

A typical embodiment of the novel separation method is depicted in Fig. 1. It will be understood that this may be associated mediately or immediately with an amination plant for the production of the mixed amines by the reaction between ammonia and methanol. As shown in Fig. 1, the charge material, which, for example, may consist of a mixture of the three methyl amines in the approximate molecular proportions of 30% trimethylamine, 45% dimethylamine and 25% trimethylamine, was fed through the feed line 11 which discharged into an intermediate section of the bubble tower 12 of suitable height. In an illustrative operation this charge was fed at the rate of 3.35 lb. mols per hour. The mixed amines passing upwardly in the tower were intimately contacted with tetramethylmethylenediamine entering the tower from a source of supply through line 13 at the rate of 1 lb. mols per hour. The vapor products from the tower consisting essentially of the dimethylamine and trimethylamine were passed through line 14 and through the refrigerated condenser 15 and thence to the receiver 16. A portion of the condensate, as shown, was returned as reflux through line 17. A reboiler 18 is associated with the base of the tower to which the liquid accumulating in the base of the tower is fed through line 19 while revaporized products are returned to the tower through line 20 and the anhydrous trimethyltrimethylenetriamine is continuously withdrawn through line 21.

In the particular illustrative operation, tower 12 was operated at atmospheric pressure, with a reflux ratio of 10 to 1. At equilibrium conditions the reboiler temperature was 166° C. and the temperature on the top tray of the tower was about 6° C. With the stated quantities of materials charged to the tower when equilibrium conditions were attained, anhydrous trimethyltrimethylenetriamine was withdrawn through line 21 at the rate of ⅓ lb. mol per hour.

As will be observed from an inspection of Fig. 1, the receiver 16 in which the dimethylamine and trimethylamine accumulates, communicates through line 22 with an intermediate section of the second bubble tower 23. This is provided with the overhead vapor line 24 discharging into the refrigerated condenser 25. Condensation from the condenser accumulates in receiver 26 and a portion of this is returned as reflux to the upper section of the tower through line 27. The condensate accumulating in receiver 26 may be periodically withdrawn through line 26'. The reboiler 28 is fed through line 29 with liquid accumulating in the base of the tower and products revaporized are returned to the tower through line 30. The tower 23, as has been described previously, is charged with a predetermined quantity of aqueous formaldehyde through the line 31. Additional makeup formaldehyde may be admitted to the system through line 32.

In the illustrative operation described and with the stated quantities of charge materials to tower 12, a mixture consisting of 3.5 lb. mols of dimethylamine and 0.8335 lb. mols of trimethylamine per hour accumulated in receiver 16. This was continuously fed through line 22 to the second tower 23 where it was contacted countercurrently with aqueous formaldehyde. A portion of the formaldehyde, regenerated in a subsequent stage of the process, was fed through line 31 at the rate of 0.75 lb. mols per hour and fresh aqueous formaldehyde was simultaneously fed through line 32 at the rate of 1 lb. mol per hour. In the tower, as previously explained under described stoichiometrical proportions (i. e., 2 mols of dimethylamine and 1 mol of formaldehyde) reaction ensues with the formation of one mol of tetramethylmethylenediamine and one mol of water. The tower was operated at atmospheric pressure with a reflux ratio of 10 to 1. At equilibrium conditions, the temperature in the reboiler was 66° C. and the temperature on the top tray was 3.5° C. In these circumstances pure trimethylamine accumulated in receiver 26 at the rate of 0.8335 lb. mols per hour of tetramethylare employed. While extraction with water immiscible solvents has been tried, this mode of separation is not successful since the distribution coefficient of the compound is very unfavorable, the tendency being to remain largely in the aqueous phase. It is known that separation can be obtained by saturating the solution with solid caustic alkali, such as sodium or potassium hydroxide, whereby stratification is effected in the upper layer of which the trimethyltrimethylenetriamine is largely concentrated. This upper layer, however, does contain traces of water and caustic alkali.

It has been found that a somewhat improved separation is achieved by adding to the aqueous trimethyltrimethylenetriamine a water immiscible diluent together with the caustic alkali. The diluent, for example, may be benzene, hexane, isopropyl ether or the like. However, even this method is not fully effective for traces of water remain in the non-aqueous phase which is sufficient in amount to produce some slight hydrolysis during the subsequent distillation to separate the trimethyltrimethylenetriamine.

In the preferred mode of procedure, these difficulties are obviated by charging anhydrous tetramethylmethylenediamine to the first tower in lieu of formaldehyde. This compound reacts equally well with methylamine to produce the trimethyltrimethylenetriamine and the latter is produced in the desired anhydrous condition since the other reaction product is dimethylamine. The anhydrous tetramethylmethylenediamine may be continuously and readily produced in the system. When dimethylamine reacts with 40 per cent. aqueous formaldehyde to form additional water and tetramethylmethylenediamine, the reaction product separates into two phases each of which contain water. It has been discovered that if this reaction product is subjected to countercurrent contact with a properly proportioned quantity of a water immiscible solvent for the tetramethylmethylenediamine, this latter is obtained in anhydrous condition in the solvent and the water is thus separated free of the tetramethylmethylenediamine. A wide range of immiscible solvents may be employed such as aliphatic or aromatic hydrocarbons, ethers and the like. Because of its economy and effectiveness, it is preferred to employ petroleum naphtha or kerosene of such initial boiling point that the tetramethylmethylenediamine can be separated readily by distillation.

The bottom product from the second bubble tower constitutes the source material for producing the anhydrous tetramethylmethylenediamine. If a portion of such bottom product which, as previously explained, consists of water and tetramethylmethylenediamine is introduced, with suitable mixing into an intermediate section of a packed column and is contacted with an upwardly flowing stream of a water immiscible solvent such as petroleum naphtha, the water will coalesce on the extended surfaces of the column and gravitate to the base of the column while substantially the whole of tetramethylmethylenediamine will be withdrawn overhead in the solvent. The withdrawn solvent may then be passed to any suitable heating unit to separate the solvent from the dissolved tetramethylmethylenediamine. For example, the stream of solvent from the top may be passed through a heat exchanger countercurrent to the hot, stripped solvent and thence to a small stripping still where the anhydrous tetramethylmethylenediamine is distilled off and is charged to the first bubble tower. The hot, denuded solvent, as noted, passes out of the still through the heat exchanger and is then recirculated to the contact column.

The trimethyltrimethylenetriamine produced in the first tower may be subjected to catalytic hydrogenation to convert it to methyl amines and to recover all of the formaldehyde used for the separation of the methylamine, either directly or in the formation of tetramethylmethylenediamine. The formaldehyde is recovered in the form of a methyl substituent on the nitrogen of the amines. As a result of comprehensive investigation it has been ascertained that when the trimethyltrimethylenetriamine is hydrogenated in liquid phase, by the use of hydrogen at from 300 to 500 pounds at a temperature of between about 80° C. and 90° C. employing Raney nickel catalyst, the three methyl amines are produced in approximately equimolecular proportions, as would be expected from the structure of the trimethyltrimethylenetriamine. The resulting mixed amines may be returned to the separation plant where they pass through the described cycle of selective reaction with added reagents. Such return is the preferred method of operation when the desideratum is the maximum yield of both dimethylamine and trimethylamine both free from methylamine.

However, the process may be carried out in a different manner to produce a relatively increased yield of dimethylamine. It has been discovered that the hydrogenation of trimethyltrimethylenetriamine, when carried out under certain novel conditions can be made to yield a product consisting largely of dimethylamine with only minor proportions of methylamine and trimethylamine. When the hydrogenation is carried out under conditions to be more fully explained, the product of hydrogenation contains 93–95 mol per cent of the dimethyl amine.

This novel hydrogenation is based on the heretofore unknown fact that when trimethyltrimethylenetriamine is vaporized, and the vapors, especially when diluted with hydrogen, are superheated, there is a drastic and almost complete dissociation of the trimethyltrimethylenetriamine to monomeric methylmethyleneamine. This latter compound can be recovered as a liquid of a volatility approximately that of dimethylamine by rapidly chilling the superheated gaseous stream in a chamber externally cooled with an effective refrigerant as, for example, Dry Ice and acetone.

Now the hydrogenation of this monomeric methylmethyleneamine can be made to proceed almost exclusively to dimethylamine. It has been determined that when a very active catalyst such as Raney nickel is employed in a high temperature vapor phase hydrogenation, considerable desmutation of the primary product to methylamine and trimethylamine does occur. This desmutation, however, can be largely avoided by utilizing a catalyst of a lower degree of activity in the vapor phase hydrogenation as, for example, one produced by the reduction of nickel hydroxide or nickel oxide, supported on an inert carrier, such as pumice or other non-absorptive carrier, utilizing hydrogen at elevated temperature as the reducing agent. When trimethyltrimethylenetriamine is vaporized, mixed with an excess of hydrogen and is passed over such described catalyst at a temperature of 195–200° C. and at a space velocity of 200 volumes per methylenediamine with water accumulated in a reboiler 28. This, as explained, may be continuously withdrawn and treated to remove the water. In the described operation, this mixture was withdrawn from the reboiler by the pump 33 and forced through line 34; a portion of this solution was forced through line 35, controlled by valve 35′, to an intermediate point in bubble tower 36 and another portion was forced through line 37, controlled by valve 37′ to the dehydration unit, to be more fully described. Of this mixture from the bottom of the reboiler 0.75 lb. mols per hour were fed to the tower 36 through line 35 and 1 lb. mol per hour to the dehydration unit through line 37.

The bubble tower 36 and its associated units, as noted previously, constitute, in effect, a stage or unit for the regeneration of the desired end product, dimethylamine, from one of the intermediate products, tetramethylmethylenediamine produced and utilized in the operation. In this unit also formaldehyde is regenerated for reemployment in the second stage of the operation, i. e., the production of the tetramethylmethylenediamine. The bubble tower, as shown, is connected through vapor line 38 to the refrigerated condenser 39 which latter communicates with the receiver 40. Reflux is fed from the receiver to the upper portion of the tower through the reflux line 41. The purified dimethylamine accumulating in the receiver may be periodically withdrawn through line 41′. The liquid products accumulating in the base of the tower are continuously fed through line 42 to reboiler 43. The material vaporized in the reboiler are returned to the tower through line 44 and the unvaporized liquid fraction, comprising aqueous formaldehyde, is picked up by pump 45 and forced through line 31 to the tower 23.

In the particular illustrative operation described herein, the tower was operated at atmospheric pressure and heat was introduced into the reboiler to keep the liquid in the lower section of the tower in a state of free ebullition. In the stated operation the temperature on the top tray was 7.4° C., in the midsection of the tower about 66° C. and in the reboiler 98° C. to 100° C. Under such conditions and with the previously stated amount of tetramethylmethylenediamine charged through line 35, pure dimethylamine accumulated in the receiver 40 at the rate of 1.5 lb. mols per hour. Contemporaneously 0.75 lb. mols per hour of formaldehyde in aqueous solution was returned to tower 23 by way of pump 45 and line 31.

As previously explained, a portion of the aqueous tetramethylmethylenediamine produced in tower 23 is treated to separate the associated water and then is fed in the resulting anhydrous condition to the first stage of separation for selective reaction with methylamine. This water separation may readily be accomplished in the manner previously described, by effectively employing a water immiscible solvent for the tetramethylmethylenediamine. The units shown in Fig. 1 are effective for the separation and are, of course, merely illustrative of any similarly functioning structure. This unit comprises essentially the packed contact column 50, the heat exchanger 51 and the stripping still 52. The column may be filled with any suitable contact material such as ½ inch ceramic Raschig rings suitably supported on the perforated plates 53 and 54. The column, as previously described, is continuously fed through line 37 which terminates in a suitable spray head or perforated coils with material withdrawn from reboiler 29, which flows downwardly in the column in intimate contact with the upwardly flowing solvent drawn from the solvent recovery unit and admitted to the base of the column through line 55. In its upward flow, due to the favorable coefficient of distribution, the tetramethylmethylenediamine is dissolved in the naphtha, or other solvent used. The water, freed of the diamine, coalesces by contact with the extended surfaces of the tower packing and gravitating to the base is discharged continuously through line 56. The solvent solution overflows from the top of the tower and passes through the line 57 and heat exchanger 51 and line 58 to an intermediate section of the stripping still 52. Heat is applied to the solution in the stripping still by suitable means such as the heating coil 59. In the still the tetramethylmethylenediamine is distilled off from the naphtha and passes through line 60, through the water cooled condenser 61 and through to the receiver 62. A portion of the condensed matter is returned as reflux through line 65. Tetramethylmethylenediamine from the receiver is returned continuously to the first bubble tower through pump 63 and line 13 in the predetermined amount required for the described selective reaction.

As noted previously, in the illustrative operation, 1 lb. mol per hour of tetramethylmethylenediamine was fed through line 37 to the packed tower 50. This represented a volume of 16.3 gallons and was accompanied by about 8 gallons of water. The solvent, which in the particular case was petroleum naphtha having an initial boiling point of 150° C., was charged to the base of the column by pump 67 at the rate of approximately 150 gallons per hour to thus produce a solution containing about 10% by volume of tetramethylmethylenediamine.

In the stripping still 52, the reflux ratio was 5 to 1, the temperature on the top tray was 85° C. and the temperature in the base was maintained between 180–190° C. by heat input through coil 59. The hot stripped solvent, as shown, passed from the base of the tower through line 66, heat exchanger 51, pump 67 and line 55 back to the tower 50. Under these described conditions tetramethylmethylenediamine was recovered in the receiver at the rate of 1 lb. mol per hour.

Figure 2:
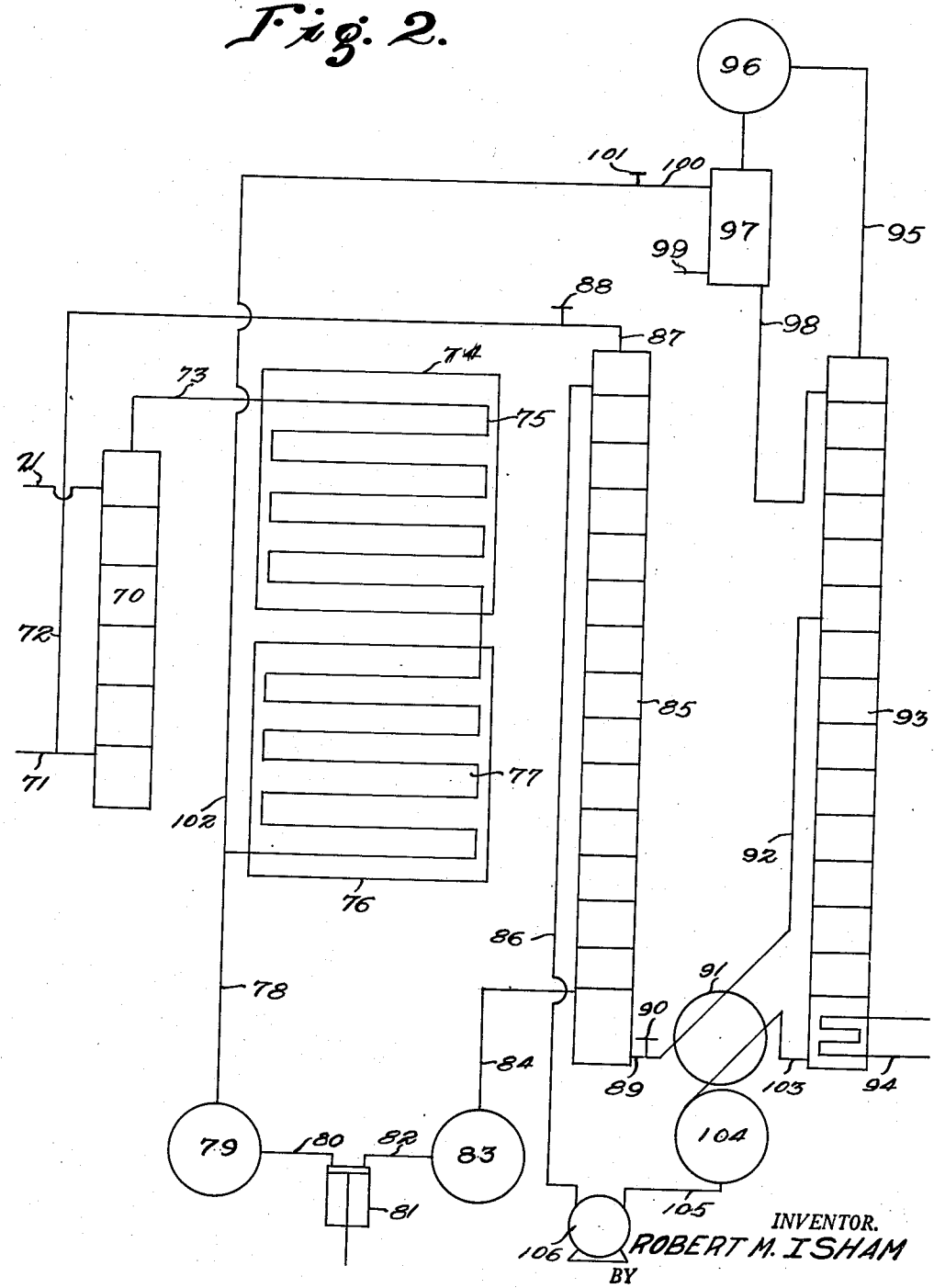
Figure 2 is a similar illustration of a unit utilized for the regeneration of methyl amines from one of the intermediate products.

As explained, hereinbefore, the improvements comprehended herein also include an eminently novel and useful process for converting one of the intermediate products formed in the purification operation, namely trimethyltrimethylenetriamine, practically quantitatively into dimethylamine. This, as has been pointed out previously, involves essentially the preliminary conversion of the trimethyltrimethylenetriamine into the monomeric methylmethyleneamine, followed by the special catalytic hydrogenation of this monomer to dimethylamine. It will be appreciated that this conversion may be carried out in different specific apparatus and with somewhat different procedures. However, in order to more clearly explain this improvement and to enable it to be more readily comprehended and evaluated, an illustrative and proven effective operation will be described; this is given didactically to illustrate the principles involved and not as limiting this phase of the invention to the particular illustrative embodiment. It will be remembered that in the first stages of the process, carried out in the bubble tower 12, trimethyltrimethylenetriamine is formed as the result of the reaction between methylamine and tetramethylmethylenediamine. This product, as previously described, is withdrawn from the bottom of reboiler 18 through the line 21. This product is passed, as shown in Fig. 2, from line 21 to the upper portion of a vaporizing tower 70 which is preferably maintained at a temperature of between about 90° and 125° C. Simultaneously, a supply of fresh hydrogen is fed to the lower section of the tower through the line 71 in admixture with recycled hydrogen charged through line 72. As the hydrogen passes upwardly through the tower, the hydrogen becomes saturated with the vapor of trimethyltrimethylenetriamine at the temperature prevailing in the tower. The saturated hydrogen passes out of the tower through line 73 to a preheater 74 wherein the stream is heated to the desired temperature. This heater may comprise a continuous coil 75 which is adapted to be heated to a temperature of the order of 250–255° C. This may be done effectively by utilizing a downtherm heating unit and heating the coil, for example, with the vapors of boiling diphenyl. It is to be observed that the coil should be so designed and proportioned that it requires about 2 minutes for the vapor-laden hydrogen stream to traverse the coil. This unit, in essence, constitutes a reactor coil in which the trimethyltrimethylenetriamine is dissociated into monomeric methylmethyleneamine.

The formed monomer is then discharged continuously into a catalyst chamber in which it is subjected to catalytic hydrogenation. This chamber is set in furnace 76 and may conveniently comprise a pipe coil 77 connected to coil 75, arranged to be externally heated, as for example, by the vapors of boiling ethylene glycol, to a temperature of 197° C. The catalyst chamber or tube is filled with a nickel catalyst of the type described, i. e., one of moderate activity, and considerably less active than Raney nickel. This catalyst contained 10% by weight of nickel supported on granular pumice. The catalyst was prepared by the reduction of nickel hydroxide by a stream of hydrogen at a temperature of 300° C. The catalyst coil was so proportioned that a space velocity of 200 volumes of hydrogen per volume of catalyst per hour was maintained. Under the stated conditions complete hydrogenation of the monometric methylmethyleneamine occurred which proceeded practically completely to dimethylamine.

The gaseous mixture is continuously discharged from the catalyst unit 77 through line 78 to a suitable cooler and thence by way of line 80 to the compressor 81. In the compressor, the gas is compressed to a suitable degree, as for example, to 200 p. s. i. gauge, and is discharged through line 82, cooler 83, and line 84 into the base of an absorber 85. In the absorber the upwardly flowing gas stream is countercurrently contacted with a liquid absorbent for the contained amines. In the illustrative example, this comprises a stream of gas oil of high initial boiling point entering the upper section of the absorber through line 86. The hydrogen contained in the gaseous stream, freed from amines, passes out of the absorber through line 87 and back pressure valve 88 to the line 72 and is recycled to the vaporizer 70.

The gas oil with the dissolved amines accumulates in the base of the absorber and is continuously passed through line 89, back pressure valve 90, heat exchanger 91 and line 92 to an intermediate section of a stripping still 93. The still is heated by means of the heating coil 94 and the dissolved amines are thus distilled off and pass through line 95 and refrigerated condenser 96 to the receiver 97. A small amount of the condensate is returned as reflux through line 98 and the remainder is periodically or continuously withdrawn through line 99. Any hydrogen which had dissolved in the gas oil and which was liberated in the stripping column 93 is vented from the receiver through line 100, back pressure valve 101 and line 102 back to line 78.

The gas oil, stripped of amines, accumulates in the base of the stripping column and is continuously recycled to the absorber through the line 103, heat exchanger 91, cooler 104, line 105 and pump 106 which forces the recycled oil through line 86 as previously described.

This process of conversion of trimethyltrimethylenetriamine is highly efficient. Thus in the operation described, substantially complete conversion of the charged trimethyltrimethylenetriamine to methyl amines was achieved and dimethylamine constituted 93 to 95 mol per cent. of the total amines recovered in receiver 97.

It will be appreciated that the process is susceptible of wide permissive latitude in operative technique; thus while the illustrative embodiment involved operation of the several stages of the process at atmospheric pressure, using refrigerated condensers, where required, it is apparent that the bubble towers could be operated at superatmospheric pressure sufficient to produce condensation of the product vapors at ordinary condenser temperatures. The unit for the production of anhydrous tetramethylmethylenediamine, i. e., elements 27 to 62 inclusive, may be conveniently operated at atmospheric temperature.

It is to be observed that while the preferred mode of operation invokes the concept of selectively reacting anhydrous tetramethylmethylenediamine with methylamine in the first stage and the continuous formation of tetramethylmethylenediamine utilizing dimethylamine and formaldehyde, the broader aspect of the invention stems from the concept of the marked utility of the specific and selective reactivity of formaldehyde and certain of its derivatives for components of the initial mixture of amines which is to be purified. Marked economies are established by utilizing formaldehyde as, so to speak, a cyclic reagent, by continuous regeneration in bubble tower 36 and recycling to bubble tower 13. As explained previously, effective separation of the methylamine from its admixture with dimethylamine and trimethylamine may be accomplished by selectively reacting formaldehyde with the primary amine to form the readily separable trimethyltrimethylenetriamine.

It is apparent also that the invention is not limited to the optimum and complete sequence of operation depicted in the drawings.

Thus, if dimethylamine is a desired end product it is obviously advantageous to directly associate or couple the catalytic conversion unit shown in Fig. 1 with the separation and purification unit of Fig. 2. It is manifest, however, that the catalytic conversion process may be utilized with trimethyltrimethylenetriamine derived from any source.

Similarly, while the unique step of producing the required tetramethylmethylenediamine by the reaction of formaldehyde with dimethylamine correlates ideally in the complete operation described, it will be realized that this operation is individually, technically useful as a method of separating dimethylamine, in purified form from admixture with trimethylamine, by cyclically utilizing an economically and readily available reagent.

Thus, while preferred embodiments of the invention have been discribed, it is to be understood that these are given, not in an exclusive or restrictive sense, but illustratively, to teach the marked technical advantages to be derived from invoking one or more of the novel concepts of the invention.

I claim:

A method of treating a mixture containing methylamine, dimethylamine and trimethylamine which comprises contacting the mixture with anhydrous tetramethylmethylenediamine in equimolecular proportion to the methylamine contained in said mixture under conditions which insure the selective reaction of the methylamine contained in the mixture with the tetramethylmethylenediamine to form thereby dimethylamine and trimethyltrimethylenetriamine; separating the trimethyltrimethylenetriamine from the dimethylamine and trimethylamine; contacting the separated di- and trimethylamine with formaldehyde in the proportion of one mol of formaldehyde to two mols of dimethylamine contained in the said separated mixture to convert thereby the dimethylamine to tetramethylmethylenediamine; separating unreacted trimethylamine from the reaction products; subjecting a portion of the formed tetramethylmethylenediamine to dehydration by countercurrently contacting the formed tetramethylmethylenediamine with a water insoluble solvent for the tetramethylmethylenediamine, separating the solvent phase from the water phase, recovering the tetramethylmethylenediamine from the solvent and recycling the dehydrated diamine for further reaction with the entering mixture and subjecting the remainder of the formed tetramethylmethylenediamine to hydrolysis to regenerate dimethylamine and formaldehyde and recovering said regenerated dimethylamine in purified form.

ROBERT M. ISHAM.

References Cited in the file of this patent

Delephine, "Compt. rend.," vol. 122, pp. 1064–1066 (1896).

Benoit et al., "Ind. Eng. Chem., Anal. Ed.," vol. 14, pp. 823–825 (1942).